United States Patent
Sarta

(10) Patent No.: US 9,164,903 B2
(45) Date of Patent: Oct. 20, 2015

(54) MEMORY MANAGER

(71) Applicant: STMicroelectronics (R&D) Ltd., Buckinghamshire (GB)

(72) Inventor: Davide Sarta, Bristol (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 104 days.

(21) Appl. No.: 13/650,503

(22) Filed: Oct. 12, 2012

(65) Prior Publication Data

US 2013/0097401 A1 Apr. 18, 2013

(30) Foreign Application Priority Data

Oct. 13, 2011 (GB) .................................. 1117706.0

(51) Int. Cl.
*G06F 12/06* (2006.01)

(52) U.S. Cl.
CPC ............ *G06F 12/0646* (2013.01); *G06F 12/06* (2013.01); *G06F 12/0607* (2013.01)

(58) Field of Classification Search
CPC .. G06F 5/065; G06F 12/0646; G06F 12/0607
USPC ....................................................... 711/173
See application file for complete search history.

(56) References Cited

U.S. PATENT DOCUMENTS

| | | | |
|---|---|---|---|
| 4,924,375 A | 5/1990 | Fung | |
| 6,138,219 A * | 10/2000 | Soman et al. | 711/149 |
| 6,202,133 B1 | 3/2001 | Jeddeloh | |
| 6,272,594 B1 | 8/2001 | Gupta | |
| 6,535,412 B1 * | 3/2003 | Maruyama et al. | 365/63 |
| 8,060,721 B1 * | 11/2011 | Yadav | 711/169 |
| 2002/0071321 A1 * | 6/2002 | Barri et al. | 365/200 |
| 2006/0236041 A1 * | 10/2006 | Sohn et al. | 711/153 |

FOREIGN PATENT DOCUMENTS

| | | |
|---|---|---|
| EP | 0 517 415 A1 | 12/1992 |
| GB | 2 256 293 A | 12/1992 |

OTHER PUBLICATIONS

Great Britain Search Report dated Feb. 3, 2012 from corresponding Great Britain Application No. 1117706.1.
Wang H., et al., *Block-Based Packet Buffer With Deterministic Packet Departures*, 2010 International Conference on High Performance Switching and Routing, published 2010, IEEE, pp. 38-43.
Oliver et al, *Embedded Memory In System-On-Chip Design: Architecture And Prototype Implementation* "Canadian Conference on Electrical and Computer Engineering. Toward a Caring and Humane Technology", published 2003, IEEE, Huang et al, vol. 1, pp. 141-146.

(Continued)

*Primary Examiner* — Kalpit Parikh
(74) *Attorney, Agent, or Firm* — Allen, Dyer, Doppelt, Milbrath & Gilchrist, P.A. Attorneys at Law

(57) ABSTRACT

A memory management device including a plurality of outputs, each output configured to interface to respective one of a plurality of memories; and a controller configured to cause each buffer allocated to the memories to be divided up substantially equally between each of the plurality of memories.

16 Claims, 5 Drawing Sheets

(56) References Cited

OTHER PUBLICATIONS

Wang F, et al., *Scalable Router Memory Architecture Based On Interleaved DRAM*, "2006 Workshop on High Performance Switching and Routing", published 2006, IEEE, pp. 57-62.

Shrimali, G, et al., *Building Packet Buffers Using Interleaved Memories* "2005 Workshop on High Performance Switching and Routing", published 2005, IEEE, pp. 1-5.

Jin et al., Embedded Memory In System-On-Chip Design: Architecture and Prototype Implementation, Canadian Conference on Electrical and Computer Engineering Toward a Caring and Humane Technology, IEEE, 2003, pp. 141-146.

Casini, "SoC Architecture to Multichannel Memory Management Using Sonics IMT," Sonics Smart Interconnects, Jul. 2008, 9 pages.

* cited by examiner

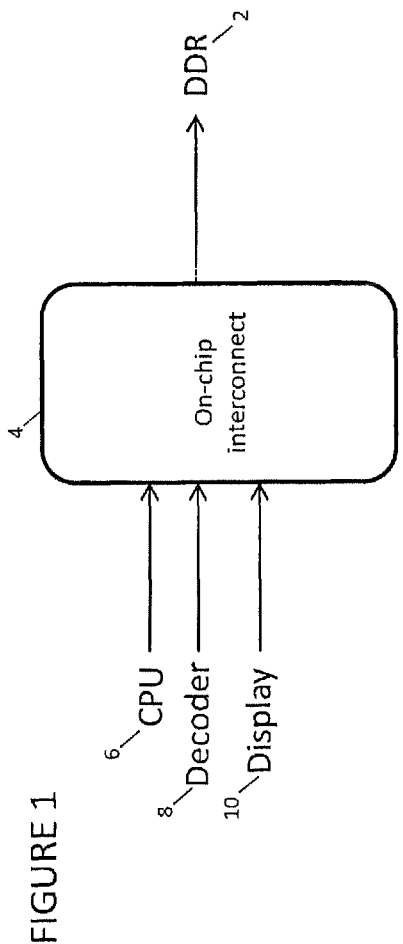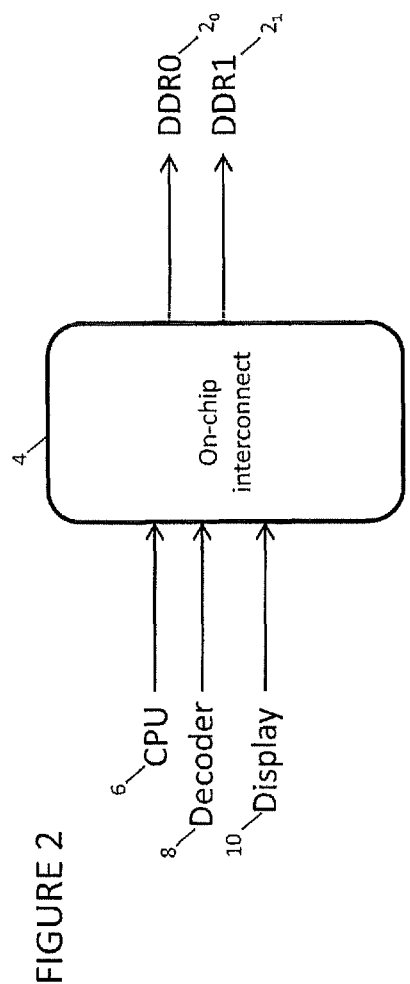
FIGURE 1
FIGURE 2

FIGURE 4a

| Spare 256MB | BF7 96MB | BF6 192MB | BF5 96MB | BF4 384MB | BF3 384MB | BF2 256MB | BF1 384MB |
|---|---|---|---|---|---|---|---|
| Spare 650 MB/s | BF7 420 MB/s | BF6 960 MB/s | BF5 1000 MB/s | BF4 400 MB/s | BF3 1600 MB/s | BF2 386 MB/s | BF1 984 MB/s |

Total Memory space = 2 GBytes
Total Available Bandwidth = 6400 MB/s

FIGURE 4b

| Spare 64MB | BF7 96MB | BF5 96MB | BF4 384MB | BF1 384MB |
|---|---|---|---|---|
| Spare 396 MB/s | BF7 420 MB/s | BF5 1000 MB/s | BF4 400 MB/s | BF1 984 MB/s |

Total Memory space = 1 GByte
Total Available Bandwidth = 3200 MB/s

| Spare 192MB | BF6 192MB | BF3 384MB | BF2 256MB |
|---|---|---|---|
| Spare 254 MB/s | BF6 960 MB/s | BF3 1600 MB/s | BF2 386 MB/s |

Total Memory space = 1 GByte
Total Available Bandwidth = 3200 MB/s

FIGURE 4c

| Spare 128 MB | ½ BF7 48 MB | ½ BF6 96 MB | ½ BF5 48 MB | ½ BF4 192 MB | ½ BF3 192 MB | ½ BF2 128 MB | ½ BF1 192 MB |
|---|---|---|---|---|---|---|---|
| Spare 325 MB/s | ½ BF7 210 MB/s | ½ BF6 480 MB/s | ½ BF5 500 MB/s | ½ BF4 200 MB/s | ½ BF3 800 MB/s | ½ BF2 193 MB/s | ½ BF1 492 MB/s |

Footprint / B/W
Total Memory space = 1 GByte
Total Available Bandwidth = 3200 MB/s

| Spare 128 MB | ½ BF7 48 MB | ½ BF6 96 MB | ½ BF5 48 MB | ½ BF4 192 MB | ½ BF3 192 MB | ½ BF2 128 MB | ½ BF1 192 MB |
|---|---|---|---|---|---|---|---|
| Spare 325 MB/s | ½ BF7 210 MB/s | ½ BF6 480 MB/s | ½ BF5 500 MB/s | ½ BF4 200 MB/s | ½ BF3 800 MB/s | ½ BF2 193 MB/s | ½ BF1 492 MB/s |

Footprint / B/W
Total Memory space = 1 GByte
Total Available Bandwidth = 3200 MB/s

US 9,164,903 B2

MEMORY MANAGER

CROSS REFERENCE TO RELATED APPLICATIONS

This application claims the priority benefit of Great Britain patent application number 1117706.0 filed on Oct. 13, 2011, which is hereby incorporated by reference to the maximum extent allowable by law.

BACKGROUND

1. Technical Field

The present disclosure relates to a memory manager for managing a plurality of memories.

2. Discussion of the Related Art

Some memory system-on-chips (SoC) may integrate two or more main memory interfaces. For example, those interfaces may be DDR (double data rate) memory interfaces.

The architecture of an SoC memory subsystem is driven by bandwidth requirement considerations, availability of hardware and/or costs in terms of integrated circuit area. In some situations, the choice of memory system may be driven primarily by bandwidth considerations versus integrated circuit area costs.

Consider a scenario where DDR bandwidth consumption is considered to be about 4,500 Mb/s (megabytes per second). If a system-on-chip needs DDR controllers with a maximum DDR frequency of 1333 MHz, such a DDR may be able to deliver around 3200 MB/s. This is assuming, for example, a data efficiency of 60%. Accordingly, one DDR does not provide the requested bandwidth. As such, a two DDR based architecture can be used. Generally, systems with two DDR memory interfaces are known. However, such a system may have in some situations some disadvantages. Usually, a two DDR memory interface requires a manual buffer allocation. When the integrated circuit is programmed, the software designer is required to select in advance how the DDR memory is allocated This may result in a waste of DDR capacity or bandwidth. Further, this may complicate on-chip interconnect. Additionally, such an arrangement is not flexible if the integrated circuit has variable patterns of usage.

SUMMARY

According to an embodiment, there is provided a memory management device comprising a plurality of outputs, each output configured to interface to respective one of a plurality of memories; and a controller configured to cause each buffer allocated to said memories to be divided up substantially equally between each of said plurality of memories.

BRIEF DESCRIPTION OF THE DRAWINGS

For an understanding of some embodiments, reference will now be made by way of example only to the accompanying figures in which:

FIG. 1 schematically shows an integrated circuit with a single DDR target;

FIG. 2 schematically shows the architecture of FIG. 1 with two DDR targets;

FIG. 4a shows a memory footprint having a plurality of buffers;

FIG. 4b shows a known approach for buffer allocation in a first and second DDR for the memory footprint of FIG. 4a;

FIG. 4c shows a buffer allocation in a first DDR and a second DDR in accordance with an embodiment, for the memory footprint of FIG. 4a;

DETAILED DESCRIPTION

Figure 3:
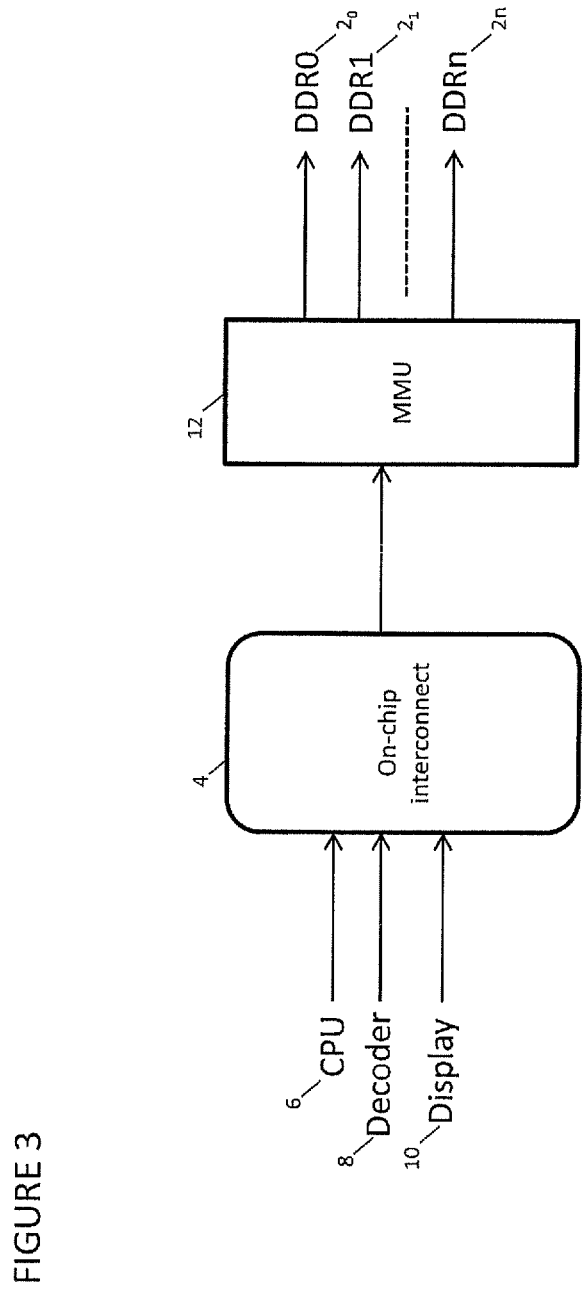
FIG. 3 shows an embodiment of an integrated circuit having a memory management unit.

In embodiments, memory buffers are accessed by the system at different rates depending on their data content. In this document, a particular part of the memory which is allocated to a particular function or content is referred to as a buffer. A buffer may contain for example a collection of Ethernet packets, video frames, or transport packets.

Some buffers need to be accessed frequently. Access to a memory can comprise reading, modifying the content and/or writing. There are other buffers which may need to be accessed much less frequently.

In order to optimize the performance of a system having two or more memories, it is often desirable to have similar usage of the two or more memories. As mentioned previously, it has been known for software designer to manually allocate the buffers. This is generally done at the time of software design. In order to achieve this, the software designers need to be aware of the plurality of DDR memories present on the system-on-chip. Additionally, the full list of buffers should be divided into a number of sublists. The number of sublists is generally the same as the number of memories. Software architects are generally concerned with providing a buffer allocation scheme which provides a balance split of requested bandwidth across the two or more memories. One issue is that the balancing of the memory loads may be to different dependent on different customers' usage cases. Accordingly, this scheme may be time consuming to implement and may be prone to errors.

With the current proposals, it may be difficult to design a splitting of the buffers across the two or more memories. It may be that one memory will be fully utilized in bandwidth Mb/s but may have some unused capacity in terms of memory space Mb. On the other hand, another memory may have some spare bandwidth but no spare memory space. Generally, if the bandwidth is already fully utilized by the allocated buffers, no extra buffer can be allocated to the remaining capacity. This results in a waste of the memory capacity. The opposite is true in the case of the spare bandwidth.

The size of the buffer refers to the number of bytes allocated to a buffer. The bandwidth is the rate at which access is required to that buffer and is usually defined in terms of bits/second. Typically, the bandwidth may be of the order of MB/s. However, in different implementations, a different bandwidth may be used.

Reference is made to FIG. 1. FIG. 1 shows a system where there is a single DDR 2. The DDR 2 communicates with an on-chip interconnect 4. In turn, the on-chip interconnect 4 communicates with a CPU (computer processing unit) 6, a decoder 8 and a display 10. The on-chip interconnect 4 will map memory requests to and from the initiators, e.g. CPU 6, decoder 8 and display 10.

Reference is now made to FIG. 2 which shows a system similar to the arrangement of FIG. 1 but with a first DDR $2_0$ and a second DDR $2_1$. In the arrangement of FIG. 2, the introduction of two DDR memories means that the on-chip interconnect 4 needs to be much more complex. This is so that a given initiator, e.g. CPU 6, decoder 8 and display 10 can communicate with either one of the DDR memories $2_0$ or $2_1$. As the interconnect is more complex, it takes up more area of the integrated circuit.

Generally, the arrangement of FIG. 1 which has a single DDR has an effective use of capacity and bandwidth. The buffer allocation in the DDR can be left to the operating system. A smaller and simpler interconnect is also required. However, the arrangement of FIG. 1 may not be suitable in all applications as the use of a single DDR may not provide enough bandwidth and/or capacity.

The arrangement of FIG. 2 provides higher capacity and/or bandwidth in that there are now two DDRs available. However, as discussed previously, the arrangement of FIG. 2 requires manual buffer allocation. The interconnect may be more complex. There may also be a waste of capacity or bandwidth.

Embodiments will now be described. In some embodiments, the buffer allocation is carried out by the operating system. Thus, in some embodiments, no design of the buffer allocation needs to be done by a software designer as the integrated circuit is being designed. In some embodiments, there may be better use of capacity and/or bandwidth. Some embodiments aim to have a relatively simple and relatively small interconnect.

Reference is now made to FIG. 3 which shows an embodiment. The embodiment of FIG. 3 comprises an on-chip interconnect 4. The on-chip interconnect 4 is coupled to a CPU 6, decoder 8 and display 10. It should be appreciated that the functions which are shown in FIG. 3 as being connected to the on-chip interconnect 4 are by way of example only. There may be additional functions coupled to the on-chip interconnect which require access to the memory. Any one or more of the functions shown may be replaced by any other suitable function. Fewer than the three functions may be provided.

The function which requires access to the memory may be provided on the integrated circuit itself or may be provided off the integrated circuit. An arrangement may be provided having a system in package with two or more dies. One or more of the functional blocks may be provided on a different die to the on-chip interconnect and/or or a memory management unit 12.

The on-chip interconnect 4 is coupled to a memory management unit 12. The memory management unit 12 is configured to interface with each of the provided memories. In the example shown in FIG. 3, there are n interfaces. These interfaces are interfaces to a respective memory controller associated with a respective memory. In this embodiment there are n memories, for example n DDRs. Generally, the number of memories will be two or more.

In one embodiment, the memory management unit 12 is provided on the same integrated circuit as the on-chip interconnect. However, in alternative embodiments, the on-chip interconnect and the memory management unit may be provided on different dies or different integrated circuits.

It should be appreciated that the memories themselves may be provided on one or more integrated circuit/die or may be provided off-chip.

With embodiments, from the perspective of the CPU, decoder and display, the system looks like it only has a single DDR. The memory management unit 12 offers to the software layers a view of a virtual unified memory system.

To understand the function provided by the memory management unit, reference is made to FIG. 4a which shows a memory which shows the buffer footprint on the left and the bandwidth allocation associated with each buffer on the right.

In the example shown, the total memory space is 2 Gbytes. This is divided up into seven buffers BF1-7, as shown on the left. For illustrative purposes, these buffers are shown as being of various sizes. The first buffer BF1 is 384 MB as is the third buffer BF3 and the fourth buffer BF4. The second buffer BF2 is 256 MB whilst the fifth buffer BF5 is 96 MB as is the seventh buffer F7. The sixth buffer BF6 is 192 MB. This is a spare memory capacity of 256 MB.

The bandwidth allocation for each of the buffers is shown on the right. The total available bandwidth is 6400 MB/s.

The first buffer BF1 has a bandwidth of 984 MB/s. The second buffer r BF2 has a bandwidth of 386 MB/s. The third buffer BF3 has a bandwidth of 1600 MB/s whilst the fourth buffer BF4 has a bandwidth of 400 MB/s. The fifth buffer BF5 has a bandwidth of a 1000 MB/s whilst the sixth buffer BF6 has a bandwidth of 960 MB/s. The seventh buffer BF7 has a bandwidth of 420 MB/s. There is a spare bandwidth of 650 MB/s.

FIG. 4b shows a result of a known technique for allocation of the buffers. Buffer allocation is shown on the left and bandwidth associated with the buffers on the right. In particular, a decision has to be taken as to which of the two memories a particular buffer is to be allocated. In this example, the first BF1, fourth BF4, fifth BF5 and seventh BF7 buffers are allocated to the first memory $2_0$.

The second BF2, third BF3 and sixth BF6 buffer regions are allocated to the second memory $2_1$. The first memory $2_0$ will have a spare capacity of 64 MB and a spare bandwidth of 396 MB/s. The second memory $2_1$ will have a spare capacity of 192 MB and the spare bandwidth of 254 MB/s. Thus, with a total memory space of 2 GBytes, one GByte is allocated to one memory $2_0$ and one GByte is allocated to the other memory $2_1$. The total required available bandwidth is 6400 MB/s. Each memory has an available bandwidth of 3200 MB/s.

Reference is now made to FIG. 4c which shows how the buffers of FIG. 4a are allocated in one embodiment of the invention. In the arrangement of FIG. 4c, each buffer is split equally between the two memories. Accordingly, half of the first buffer BF1 is provided in the first memory $2_0$ and half of the first buffer is provided in the second memory $2_1$. Thus, for each of the other buffers, including the second, third, fourth, fifth, sixth and seventh buffers, half of the buffers are provided in each of the memories. The spare capacity is divided equally between the two memories. Similarly, the bandwidth associated with each buffer to region is equally divided between the two memories.

In embodiments, the memory management unit 12 is configured to control the splitting of the buffers between the memory regions. In one embodiment, the splitting of the buffers is done so that each buffer is equally split between two memory regions. In some embodiments, this may mean that no analysis needs to take place of the buffer and the usage thereof.

Since there is no analysis of the traffic, the memory management unit 12 is simply able to automatically split the software buffers across the memory regions without any sophisticated programming required by for example software designers during design.

In some embodiments, the implementation of the hardware performing the split, which in one embodiment may be the memory management unit, is transparent to software layers and independent of the customer use cases. Thus, from the perspective of the CPU, decoder and display, it is as if there is a single memory space. In some embodiments, the implementation is buffer size and position independent. Regardless of the number, size and start addresses, and the distribution of data traffic of the users, the memory management unit is in some embodiments able to perform the required division of the buffers without any software intervention.

The split of each buffer creates "n" buffers with n equal to the number of memories. In the example shown in FIG. 4c, there are two memories. Of course, the number of memories may be more than two. In some embodiments, all the buffers in the memories should be equal or very similar in size and data access rate.

Figure 5:
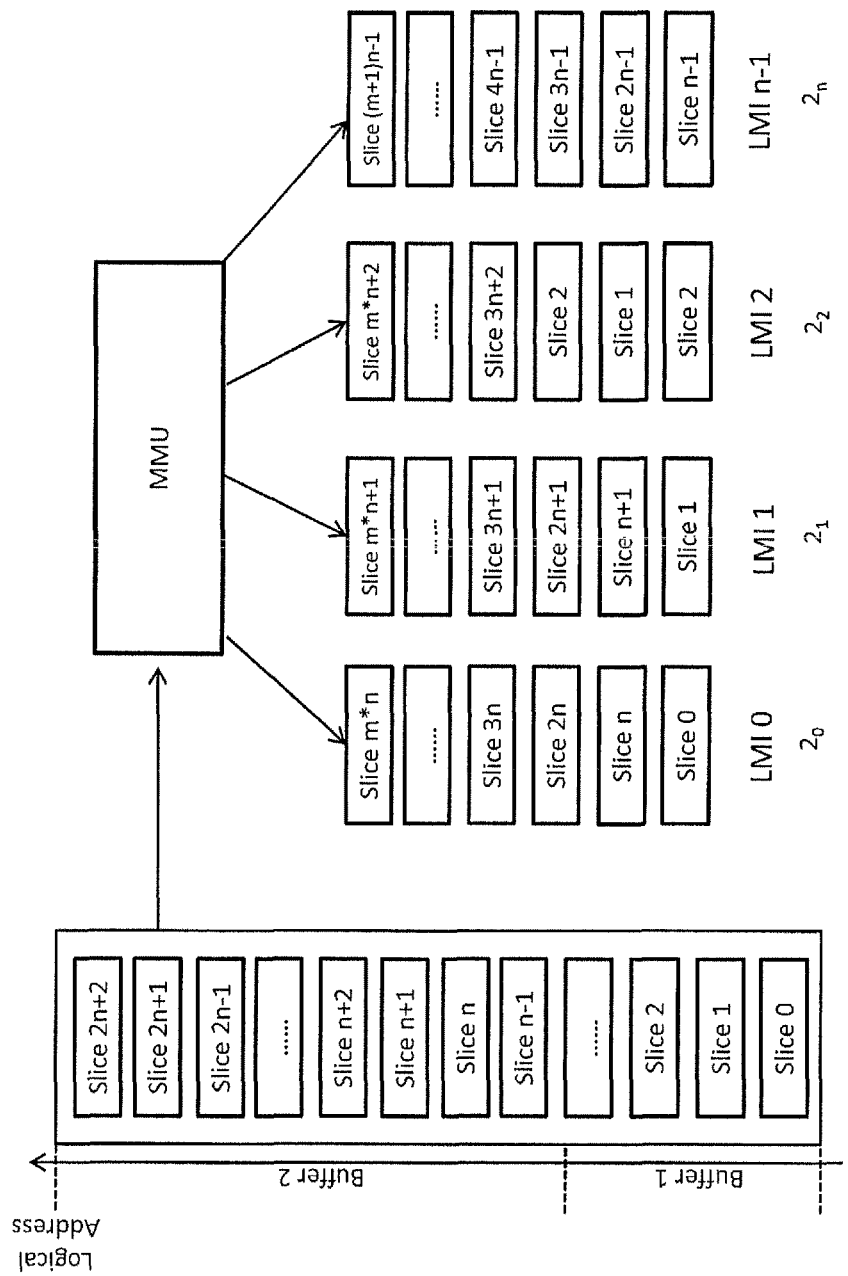
FIG. 5 schematically shows the splitting of the memory footprint in an embodiment.

One embodiment for illustrating how the buffers may be divided across the memory is shown schematically in FIG. 5. In the example shown in FIG. 5, there are n memories $2_0$ to $2_n$. The MMU is configured to split the memory space according to an address interleaving scheme. The logical memory space is divided into slices and slices are allocated to a given DDR interface following for example a rotating algorithm. The memory buffer is not contiguously placed into one physical memory but distributed over the n memories. As shown in FIG. 5, the memory is configured to slice-up each buffer. For example in FIG. 5, the first buffer BF1 is sliced into slices slice 0 to slice n−2. The second buffer BF2 is sliced into n+4 slices numbered from n−1 to 2n+2. Slice n−1 goes to into the nth memory $2_n$, slice n goes into the first memory $2_0$, the next slice n+1 goes into the next memory $2_1$ and so on.

In some embodiments, a cycle is followed. In one embodiment, a first slice goes to a first memory, the second slice to a second memory, and so on to the nth slice going into the nth memory. The next slice after that goes into the first memory. However, a more complicated to pattern may be used in some embodiments, provided that that same pattern is repeated. For example, the first memory slice could go to the third memory, the second memory slice could go to the first memory and so on.

In some embodiments, the slice size is selected according to the following criteria. If the slice is too large, the variability of bandwidth consumption which is contained in each buffer may produce an uneven memory load. For example, if it is chosen to have a slice size as half of the smallest buffer and the access rate of the data in each buffer is higher in the first half and lower in the second half, this might result in a much higher memory bandwidth consumption in one of the two memories. On the other hand, if a slice is too small, this may affect the efficiency of the memory. For example, if a slice size is, say, 4 bytes and the average requested transaction size is 32 bytes, most of the transactions will be split across more than one memory. This will have an increase memory overhead, for example page misses and intra-transaction out of order issues may need to be addressed.

Generally, the slice should be of the smallest possible which is at the same time large enough not to affect the page hit rate on each memory. In some embodiments, it is desirable to make sure that the slice would not break atomic transactions. In other words, the slice will not break up packets.

In one embodiment, the slice size is selected to be equal to a memory page size. In this regard, some embodiments may be particularly applicable to memories which use pages such as DDRs. A typical page size is 1 or 2 KB.

It should be appreciated that in alternative embodiments, other sizes of slices may be used. In some embodiments, a slice size of two or more pages may be appropriate. In some embodiments, a slice which is smaller than a page may also be used.

In some embodiments, diverting the traffic to two different memories may generate an out-of-order response traffic. In other words, transactions which are sent earlier could be returned later.

In some embodiments, atomic transactions such as packets or bursts should keep their integrity. In other words, the cells or beats should be returned in the correct order. In some embodiments, this is provided by the characteristics of the protocol. For example in one protocol all packets wrap inside their size. For example, an instruction of load 32 bytes will always address data contained in a 32 bytes aligned slice even if the start address is not 32 bytes aligned. As a result, in this particular protocol a packet will not cross a 1 KB or multiple thereof memory slice.

Some embodiments may be used with AHB (AMBA (Advanced Micro Controller Bus Architecture) High Performance Bus) protocol. For the burst of type wrap, a similar situation applies as mentioned in respect of the previous protocol. For other types of bursts, the AHB protocol specifies that a 1 KB page should not be crossed.

These protocols which were given by way of example provide inter-packet ordering.

It should be appreciated that some embodiments may be used with protocols which do not necessarily guarantee inter-packet ordering. In such embodiments, a re-ordering block may be used.

In one embodiment, the MMU can introduce inter-packet out-of-order response traffic. Packets are issued by an initiator. In this example, the initiator may be a CPU, decoder or display. The packets are issued in the order P1, P2, P3, P4. However, responses to those packets may be returned in a different order, e.g. P3, P1, P4, P2. This may be a problem for some initiators. It should be appreciated that in some embodiments this is not a problem for other initiators.

In one embodiment, the inter-packet out-of-order may be resolved cumulatively before the response packet traffic is re-distributed back to the requesting initiator. In other words, the memory management unit will output the packets in the correct order to the on-chip interconnect.

Alternatively or additionally, the re-ordering may be done at the initiator level. For example, the CPU may be arranged to re-order the received packets into the correct order. There are known techniques for achieving this re-ordering.

Some embodiments may be used with chunks and messages.

Figure 6:
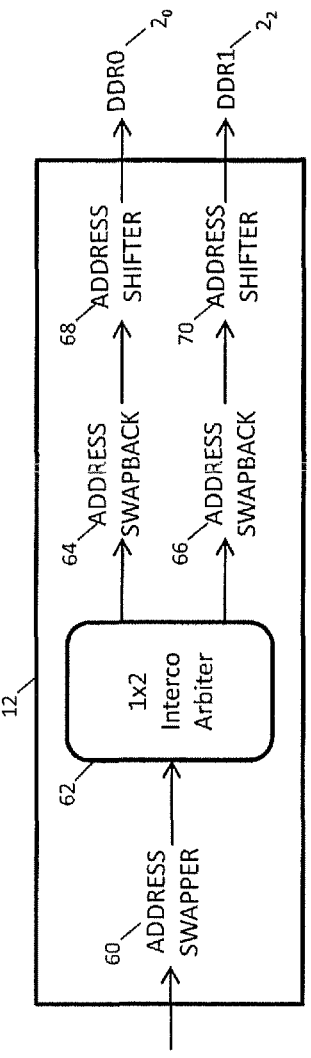
FIG. 6 shows an embodiment for the memory management device.

Reference is made to FIG. 6 which shows an implementation of a MMU in an embodiment. The MMU 12 comprises a first address swapper 60. The address swapper is configured to receive requests from the on-chip interconnect. The address swapper, will in the case of two memories, divide the pages into two. The odd pages are directed to one memory and the even pages are directed to the other memory. In the following example, the memories are each assumed to be 1 GB and each page to be 1 KB.

In this example, the address swapper will swap address bit 10 with address bit 30.

out_addr[30]<=in_addr[10];
out_addr[29:11]<=in_addr[29:11];
out_addr[10]<=in_addr[30];
out_addr[9:0]<=in_addr[9:0];

This will have the effect of dividing the odd and even page numbers.

The output of the address swapper 60 is provided to an arbiter 62. The arbiter 62 is arranged to provide two output streams. The arbiter maps the 1st GB to the first memory and the 2nd GB to the second memory. This is done on the basis of the swapped address.

The output stream is provided to a first address swap back block 64. The second output stream is provided to a second address swap block 66. The address swap back blocks will reverse the address swapping performed by the address swapper 60.

In this example the address swap back blocks will swap address bit 30 with address bit 10 out2_addr[30]<=in2_addr[10];//=in_addr[30]
    out2_addr[29:11]<=in2_addr[29:11];//=in_addr[29: 11]
    out2_addr[10]<=in2_addr[30] ;//=in_addr[10]
    out2_addr[9:0]<=in2_addr[9:0] ;//=in_addr[9:0]

The output of the respective address swap blocks 64 and 66 are provided to respective address shifters 68 and 70. The outputs of the respective shifters 68 and 70 are provided to respective memories 72 and 74.

The address shifters will shift down addresses [30:11] by 1, removing bit 10 out3_addr[29:10]<=out2_addr[30:11];
    out3_addr[9:0]<=out2_addr[9:0];

This has the effect of shifting the memory address so the pages are contiguous in each memory.

Figure 7:
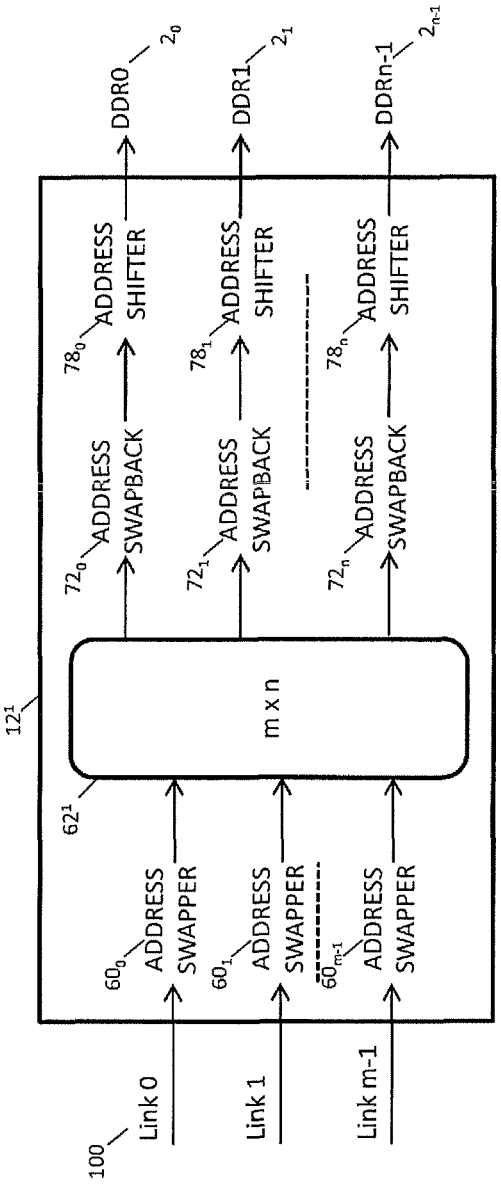
FIG. 7 shows an alternative embodiment for the memory management device.

Reference is made to FIG. 7 shows an alternative embodiment for the memory management unit. In this embodiment, the memory management unit 12' is provided with links 100. The links are referenced Link 0 to Link m-1. Each link is provided to the input of a respective address swapper $60_0$ to $60_{m-1}$. The output of the each of the address swappers are provided to the input an m by n arbiter. M is the number of input links and n is the number of memories. The arbiter has n outputs and has an output provided to each of n address swap back units $72_0$ to $72_{n-1}$.

Each address swap back unit provides a respective output to a respective address shifter $78_0$ to $78_{n-1}$. The output of each address shifter is provided to a respective memory $2_0$ to $2_{n-1}$. The address swappers, address swap back units and address shifters operate as described in relation to the previous embodiment.

Some embodiments may use more than one link between the main interconnect and the memory management unit if for example, that link is not able to match the high bandwidth that the two or more memories offer. In this case, the arrangement shown in FIG. 7 may be used which increases the number of interconnect links.

In some embodiments, a system-on-chip with high bandwidth requirements requiring more than one memory interface can be seen as implemented with a single interface. The memory management unit effectively hides the real structure of the memory sub-system to the system and to the software layers. This means that when the product is designed, it can be designed and programmed as if the system-on-chip was equipped with a virtual single memory interface. Any space capacity and/or bandwidth, even if actually physically split across several memories is seen by the system as associated to a contiguous memory space. Thus, the spare memory space can be used more efficiently.

Some embodiments may not include any additional latency as compared to current arrangements.

Embodiments have been with reference to DDRs. It should be appreciated that alternative embodiments may be used with any other suitable memory.

Some examples of methods for splitting the buffers between the memories have been described. It should be appreciated that any other suitable method for splitting the buffers may be used.

It should be appreciated that in some embodiments, an algorithm or computer program may be used to control the splitting of the buffers. The algorithm or computer program may be provided by a suitable computer program product and/or be stored in one or more memories. The computer program or algorithm may comprise one or more computer executable instructions, which when run, cause the method to be performed. The computer program or algorithm may be run on one or more processors in conjunction with one or more memories or data store.

Some embodiments may provide a non-transitory computer-readable medium having a program loadable in an internal memory of a computer.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An electronic device comprising:
    a plurality of separate memories; and
    a memory management device comprising
        a plurality of outputs, each output configured to interface to a respective one of said plurality of separate memories, and
        a controller configured to
            generate a plurality of buffers to be stored in said plurality of separate memories,
            cause each buffer to be divided up equally into a set number of buffer slices, the set number being equal to a number of separate memories in said plurality thereof, and
            allocate each buffer slice into a respective separate memory from said plurality of separate memories, the set number of buffer slices for each buffer being stored in corresponding different memories of said plurality of separate memories;
    said controller comprising
        an address manipulator configured to manipulate an address associated with each buffer slice,
        an arbiter configured to receive an output from said address manipulator and to direct the received output from said address manipulator to a respective arbiter output, each arbiter output being associated with a respective separate memory, and
        a plurality of address de-manipulators, each address de-manipulator associated with a respective separate memory, each address de-manipulator being configured to reverse address manipulation performed by said address manipulator.

2. The electronic device as claimed in claim 1, wherein said controller is configured to cause buffer slices of each buffer to be allocated on a rotating basis.

3. The electronic device as claimed in claim 1, wherein each buffer slice corresponds to a page of one of said plurality of separate memories.

4. The electronic device as claimed in claim 1, wherein said address manipulator is configured to provide a manipulated address associated with each buffer slice that defines which of the plurality of separate memories a respective buffer slice is associated.

5. The electronic device as claimed in claim 1, wherein said address manipulator is configured to swap bit x with bit y of said address.

6. The electronic device as claimed in claim 1, further comprising:
    a plurality of initiators configured to generate a plurality of memory transactions; and an interconnect configured to receive the plurality of memory transactions; and wherein said controller comprises a plurality of links coupled to said interconnect and associated respectively with said plurality of initiators; and wherein said address manipulator comprises a plurality thereof respectively coupled to said plurality of links.

7. The electronic device as claimed in claim 1, wherein said controller comprises a plurality of address shifters, each address shifter associated with a respective separate memory, each address shifter being configured to shift addresses of buffer slices such that said buffer slices occupy contiguous locations in said respective separate memory.

8. The electronic device as claimed in claim 1, wherein said plurality of separate memories comprises a plurality of double data rate memories.

9. A memory management device in an electronic device comprising a plurality of separate memories, the memory management device comprising:
    a plurality of outputs, each output configured to interface to a respective one of said plurality of separate memories; and
    a controller configured to
        generate a plurality of buffers to be stored in said plurality of separate memories,
        cause each buffer to be divided up equally into a set number of buffer slices, the set number being equal to a number of separate memories in said plurality thereof, and
        allocate each buffer slice into a respective separate memory from said plurality of separate memories, the set number of buffer slices for each buffer being stored in corresponding different memories of the plurality of separate memories;
    said controller comprising
        an address manipulator configured to manipulate an address associated with each buffer slice,
        an arbiter configured to receive an output from said address manipulator and to direct the received output from said address manipulator to a respective arbiter output, each arbiter output being associated with a respective separate memory, and
        a plurality of address de-manipulators, each address de-manipulator associated with a respective separate memory, each address de-manipulator being configured to reverse address manipulation performed by said address manipulator.

10. The memory management device as claimed in claim 9, wherein said controller is configured to cause buffer slices of each buffer to be allocated on a rotating basis.

11. The memory management device as claimed in claim 9, wherein each buffer slice corresponds to a page of one of said plurality of separate memories.

12. The memory management device as claimed in claim 9, wherein said address manipulator is configured to provide a manipulated address associated with each buffer slice that defines which of the plurality of separate memories a respective buffer slice is associated.

13. A method for operating an electronic device comprising:
    operating a memory management device comprising a plurality of outputs, each output to interface to a respective one of a plurality of separate memories, and a controller,
    operating the controller to
        generate a plurality of buffers to be stored in the plurality of separate memories,
        cause each buffer to be divided up equally into a set number of buffer slices, the set number being equal to a number of separate memories in the plurality thereof, and
        allocate each buffer slice into a respective separate memory from the plurality of separate memories, the set number of buffer slices for each buffer being stored in corresponding different memories of the plurality of separate memories;
    operating an address manipulator to manipulate an address associated with each buffer slice;
    operating an arbiter to receive an output from the address manipulator and to direct the received output from the address manipulator to a respective arbiter output, each arbiter output being associated with a respective separate memory; and
    operating a plurality of address de-manipulators so that each address de-manipulator is associated with a respective separate memory and reverses address manipulation performed by the address manipulator.

14. The method as claimed in claim 13, further comprising operating the controller to cause buffer slices of each buffer to be allocated on a rotating basis.

15. The method as claimed in claim 13, wherein each buffer slice corresponds to a page of one of the plurality of separate memories.

16. The method as claimed in claim 13, further comprising operating the address manipulator to provide a manipulated address associated with each buffer slice that defines which of the plurality of separate memories a respective buffer slice is associated.

* * * * *